(12) United States Patent     (10) Patent No.:   US 12,696,873 B2

Condon     (45) Date of Patent:     *Aug. 4, 2026

(54) DOG TRAINING DEVICE

(71) Applicant: Mark Condon, Framingham, MA (US)

(72) Inventor: Mark Condon, Framingham, MA (US)

( * ) Notice: Subject to any disclaimer, the term of this patent is extended or adjusted under 35 U.S.C. 154(b) by 32 days.

This patent is subject to a terminal disclaimer.

(21) Appl. No.: 18/785,291

(22) Filed: Jul. 26, 2024

(65) Prior Publication Data

US 2024/0381842 A1     Nov. 21, 2024

Related U.S. Application Data

(63) Continuation-in-part of application No. 18/449,484, filed on Aug. 14, 2023, now Pat. No. 12,070,013.

(60) Provisional application No. 63/398,891, filed on Aug. 18, 2022.

(51) Int. Cl.
    *A01K 15/02*     (2006.01)

(52) U.S. Cl.
    CPC ............ *A01K 15/021* (2013.01); *A01K 15/02* (2013.01); *A01K 15/025* (2013.01)

(58) Field of Classification Search
    CPC ..... A01K 15/021; A01K 15/02; A01K 15/025
    See application file for complete search history.

(56) References Cited

U.S. PATENT DOCUMENTS

| | | | |
|---|---|---|---|
| 5,604,478 A | 2/1997 | Grady | |
| 6,240,880 B1 | 6/2001 | Jones | |

| | | | |
|---|---|---|---|
| 6,445,302 B2 | 9/2002 | Vena | |
| 6,560,926 B1 * | 5/2003 | Gillett | E06B 7/32 |
| | | | 49/362 |
| 7,654,230 B2 | 2/2010 | Kroll | |
| 8,944,006 B2 | 2/2015 | Anderson | |
| 9,737,049 B2 | 8/2017 | Trottier | |
| 9,826,715 B2 | 11/2017 | Neskin | |
| 10,033,923 B2 | 7/2018 | Unger | |
| 11,197,463 B2 * | 12/2021 | Burton | E06B 7/32 |
| 12,070,013 B2 * | 8/2024 | Condon | A01K 15/02 |
| 2012/0312247 A1 * | 12/2012 | Ebersole | A01K 15/02 |
| | | | 340/573.3 |
| 2016/0366859 A1 | 12/2016 | Prasanna | |

(Continued)

FOREIGN PATENT DOCUMENTS

| | | |
|---|---|---|
| WO | 2006019488 A1 | 2/2006 |
| WO | 2010108496 A1 | 9/2010 |

*Primary Examiner* — John A Tweel, Jr.

(74) *Attorney, Agent, or Firm* — Lambert Shortell & Connaughton; David J. Connaughton, Jr.; Justin P. Tinger

(57) ABSTRACT

The present disclosure introduces a dog training device, an electronic communication system for dog training, and various other interoperable methods, features, and components. The dog training device may allow dogs or other animals to activate a button, initiating communication with a user's computerized device through a wireless transmission system. Upon activation, the training device may send a signal to the computerized device, enabling remote authorization for an automated door system to open. A video monitor may facilitate real-time interaction between the user and their pet. An integrated smart home system may further enhance convenience and control. This comprehensive solution offers seamless training, monitoring, and interaction, fostering a stronger bond between pet and owner.

20 Claims, 4 Drawing Sheets

(56) References Cited

U.S. PATENT DOCUMENTS

| | | |
|---|---|---|
| 2020/0236901 A1 | 7/2020 | Trottier |
| 2023/0143669 A1 | 5/2023 | O'Dwyer |

* cited by examiner

DOG TRAINING DEVICE

BACKGROUND OF THE INVENTION

The present disclosure relates generally to a dog training device. More particularly, the present disclosure relates to a dog training device that may be operable to send a signal to a computerized device via a transmission system upon activation of a button, sensor, or the like by a dog or other animal.

In recent years, pet owners have increasingly sought effective and innovative ways to train and interact with their dogs, fostering positive behavioral reinforcement and strengthening the human-animal bond. Traditional dog training methods have limitations, often requiring direct physical presence and restricting training sessions to specific times and locations.

While some remote training solutions have been attempted, there are inherent challenges in achieving predictable outcomes. Remote training methods may not always yield consistent results due to the complexity of canine behavior and the varied responses of individual dogs. Moreover, some remote devices lack the ability to facilitate real-time interaction and may not adequately address the specific needs and preferences of each dog.

Therefore, what is needed is a dog training device having all of the further described features and advantages.

SUMMARY OF THE INVENTION

The subject matter of this application may involve, in some cases, interrelated products, alternative solutions to a particular problem, and/or a plurality of different uses of a single system or article.

In one aspect, a training device is disclosed. In this aspect the device includes a button to be activated by an animal. The training device also includes a transmission system, a processor, and a memory all housed within the device. The memory stores instructions for the processor, which is programmed to send a signal via the transmission system upon activation of the button.

In another aspect, an electronic communication system is disclosed. In this aspect, the electronic communication system includes a training device having a button to be activated by an animal and a transmission system housed within the training device. The training device is operable to transmit a signal via the transmission system, and a computerized device is operable to receive the signal from the training device over the electronic communication system.

DETAILED DESCRIPTION OF THE INVENTION

Figure 1:
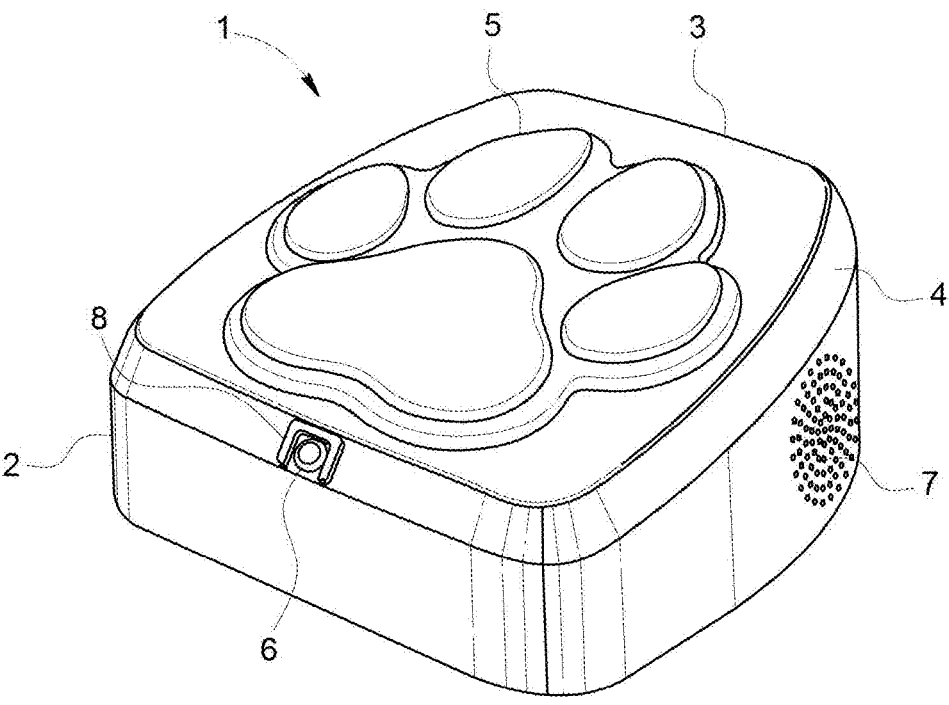
FIG. 1 provides a perspective view of one embodiment of the dog training device.

The detailed description set forth below in connection with the appended drawings is intended as a description of presently preferred embodiments of the invention and does not represent the only forms in which the present disclosure may be constructed and/or utilized. The description sets forth the functions and/or the sequence of steps for constructing and operating the invention in connection with the illustrated embodiments.

The present disclosure is directed at a dog training device which allows a dog, a cat, or other animal to "push" or otherwise activate a button, sensor, or the like. The device is equipped with a wired or wireless transmission system such as a wireless transmitter or transceiver, or a wired modem or communications port. Upon activation by the dog, the device has programming stored in a memory which causes a processor or similar device to send a signal via the transmission system. The signal is receivable by a user's computerized device such as a smartphone, tablet, laptop or desktop computer, smart TV, smart watch, and the like.

Upon receipt of the signal, the user's computerized device is operable to present a notification, such as a push notification, text message notification, automated call, and the like. The notification informs the user that the dog is requesting something. Typically, the dog may be trained to activate the button to request to go outside to urinate, and/or defecate. However, the dog may be trained to use the device for other requests in addition or instead. For example, the dog may be trained to activate the button if hungry, thirsty, wants to go out and play or for a walk, and the like. Similarly, the dog may be trained to press the button in the event of an emergency with the dog's owner and/or handler. The emergency may be a medical emergency such as a heart attack, stroke, fall, and the like. The training can be accomplished in any manner without straying from the scope of this invention. Exemplary and non-limiting embodiments of the present disclosure are shown herein in the Figures. In the embodiment shown in the figures, the button is shaped like a dog's paw, but this is not necessarily required and other shapes for the button may be used.

In one embodiment, the device may also have a built-in camera which may be fixed or movable for up to 360 degree viewing. Still and/or video images of the device's surroundings, including the dog may be viewed from a user computer which is in networked communication with the transmission system of the device. In embodiments wherein the camera is movable, the device may be operable to receive a signal input from the user computer which causes the processor to actuate a motor to move the camera's orientation based on the input signal.

In another embodiment, the system may include an app which is programmed to allow operation and access to the device on a smartphone or other user computer. The app may include a user interface which allows users to receive notifications from the device and to operate the device remotely. In some embodiments, the device may be operable with a smart home system such as Google Home® and Amazon Alexa® and the like.

In yet another embodiment, an electronic communication system that may incorporate the dog training device, a user's computerized device, and an automated door system is disclosed. The dog training device, equipped with a button or sensor, may allow the dog to initiate communication with the user through the device's transmission system. When the dog activates the button, a signal may be sent to the user's computerized device, prompting the device to generate a notification for the user. Upon receiving this notification, the user may give authorization to open the automated door system, thus granting the dog access to the outside. To ensure safety, it may be preferred that the outside area is fenced in.

The automated door system, which in one embodiment is integrated into the electronic communication system, may offer added convenience and functionality. For example, the door system may be configured to open and close either laterally or vertically, providing flexibility to accommodate various installation preferences. When the dog owner receives a notification that the button was pressed, they may be able to remotely authorize the automated door system to open, allowing the dog to go outside as needed. Alternatively, in one embodiment, the door system may open or close after receiving a signal that the dog training device's button was pressed. In some embodiments, the door system may also close automatically, or in embodiments without automated closure, the user may remotely open or close the automated door through their computerized device.

In certain embodiments, the dog training device may be designed with waterproof or water-resistant features, such as an enclosure design minimizing points for water entry, a coating covering the internal electronic components of the device, a sealant covering any gaps in the device, or similar methods, as will be appreciated by those skilled in the art. In such embodiments, the waterproof or water-resistant feature may enable the device to withstand exposure to outdoor elements, allowing it to be positioned outside for extended periods. For example, in one embodiment, a dog wishing to return indoors may press the button to notify the user or open an automated door. While embodiments of the device that are water resistant may enhance overall suitability for outdoor use, it should be expressly noted that the device can still be employed effectively outdoors without being fully waterproof or even minimally water resistant.

In another embodiment, for enhanced monitoring and interaction, the electronic communication system may feature a two-way video monitor that may be attached to the dog training device. The video monitor may enable real-time video communication between a user and their pet by utilizing a camera to capture the dog's actions and behavior and by providing live video feed accessible from the user's computerized device. This two-way video communication may allow the user to observe their pet, issue commands, and offer reassurance or encouragement during training sessions, even when the two are physically separated.

In one embodiment, the two-way video monitor may be attached to the top of the dog training device. In another embodiment, the video monitor may be strategically located beneath an activation button. For example, in this alternate embodiment, the pressing of the button may trigger a mechanical mechanism that causes the video monitor to rotate or pop up. As will be appreciated by those skilled in the art, several mechanisms may be employed to achieve the placement of the video monitor underneath the device's activation button, including, but not limited to, a spring-loaded mechanism, a hinged pivot mechanism, or a rotational arm mechanism, and the like.

In some embodiments, to further enhance the training experience and enable the user to respond promptly to their pet's actions and needs, the electronic communication system may be integrated with a smart home system, such as Google Home® or Amazon Alexa®, providing additional smart functionalities and accessibility. This integration may allow the user to control the dog training device, the automated door system, or the video monitor through voice commands or the smart home system's centralized interface.

Turning now to FIG. 1, which provides a perspective view of one embodiment of the dog training device 1. In this embodiment, the core components of the dog training device 1 include a base 2 that serves as a foundation for an elevated platform 3, which is securely attached to the base 2. To enhance both aesthetics and safety, the device 1 features a bevel 4 or sloped surface, which provides both a gradual transition from the base 2 to the platform 3 and eliminates sharp corners.

Positioned on top of the platform 3 is a large, easily accessible button 5, which serves as a control or activation mechanism for some of the functions of the device 1, for example, the transmission of a signal from the device 1 to an external computerized device. In this embodiment, a camera 6 is built into the bevel 4 just below the button 5 on a front face of the device 1, which enables a remote monitoring functionality. The device 1 is also equipped with speakers 7 positioned on at least one of the left or right faces on the base 2 of the device 1.

The camera 6 enables a remote monitoring functionality by allowing visual signals transmitted from the device 1 to be displayed on a user's computerized device. Similarly, the speakers 7 facilitate communication between dog owners and their pets by allowing audio signals transmitted from a user's computerized device to be projected into the space where the device 1 is located. Furthermore, to ensure longevity of the monitoring function, a protruding barrier 8 surrounds and shields the camera 6, which may safeguard against potential damage and interference.

Figure 2:
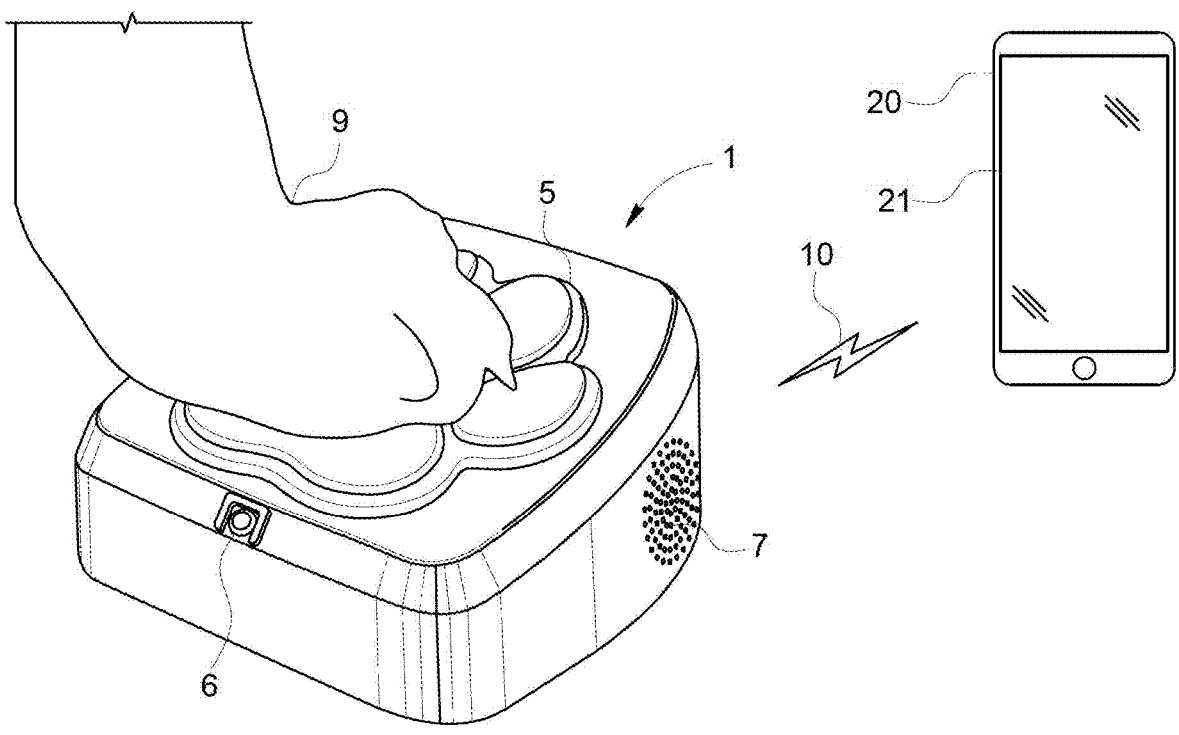
FIG. 2 provides a perspective view of one embodiment of the dog training device communicating with a computerized device.

FIG. 2 provides a perspective view of one embodiment of the dog training device 1 establishing communication with a computerized device 20 through a wireless signal 10. As shown, the training device 1 is activated by a dog pressing the button 5 using its paw 9. Upon activation, the training device 1 is programmed to transmit a wireless signal 10 to a computerized device 20.

Upon receipt of the wireless signal 10, the computerized device 20 is operable to display a notification on a graphic user interface 21. This user interface 21 is also configured to present other relevant information and interact with the training device 1. For example, the user interface 21 is configured to display still and/or video images received via a wireless signal 10 from the built-in camera 6 of the training device 1. This feature may allow dog owners to view real-time visuals of their pets, enhancing their ability to monitor and assess their animal's behavior and response to training efforts.

Additionally, in this embodiment, along with the capability to receive wireless signals 10 from the training device 1, the computerized device 20 can also transmit signals 10 to the training device 1. For example, the computerized device 20 is operable to transmit audio signals to the dog training device 1, which are converted into audible sounds through integrated speakers 7. These audible sounds are then projected into the space around the training device 1. This feature enhances the user's ability to guide their pet's behavior and actions from a distance.

To further enhance the training process, in this embodiment, the camera 6 is designed to be movable for up to 360-degree viewing. This means that the orientation of the camera 6 can be adjusted to capture images and/or video from various angles, providing comprehensive coverage of the training area. To facilitate this functionality, the training device 1 is equipped with a motor and mechanism that allows the camera 6 to be repositioned based on received signals 10 from a user's computerized device 20. For example, when the training device 1 receives specific input signals through the transmission system, this actuates the motor to move the orientation of the camera 6 accordingly.

The input signals may be generated by the user through an application displayed on the graphic user interface 21 of the computerized device 20. By interacting with the user interface 21 and providing specific commands or adjustments, the user can remotely control the movement of the camera 6, directing it to focus on different areas or angles within the training environment. This interactive feature may allow users to make real-time adjustments to the camera's orientation, ensuring that no critical training moments are missed and enabling them to respond promptly to their pet's actions or needs.

Figure 3A:
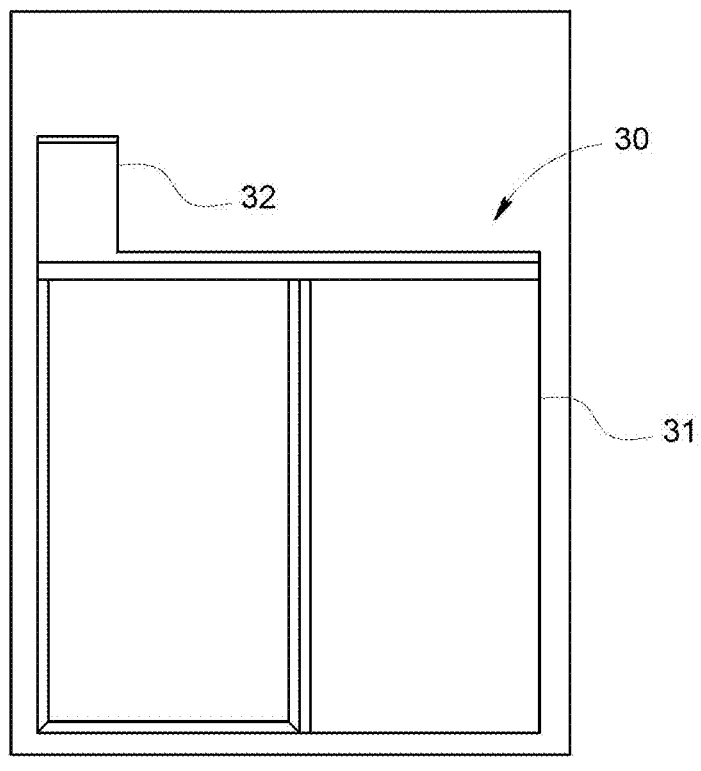
FIG. 3*a* provides a perspective view of one embodiment of an automated door system.
Figure 3B:
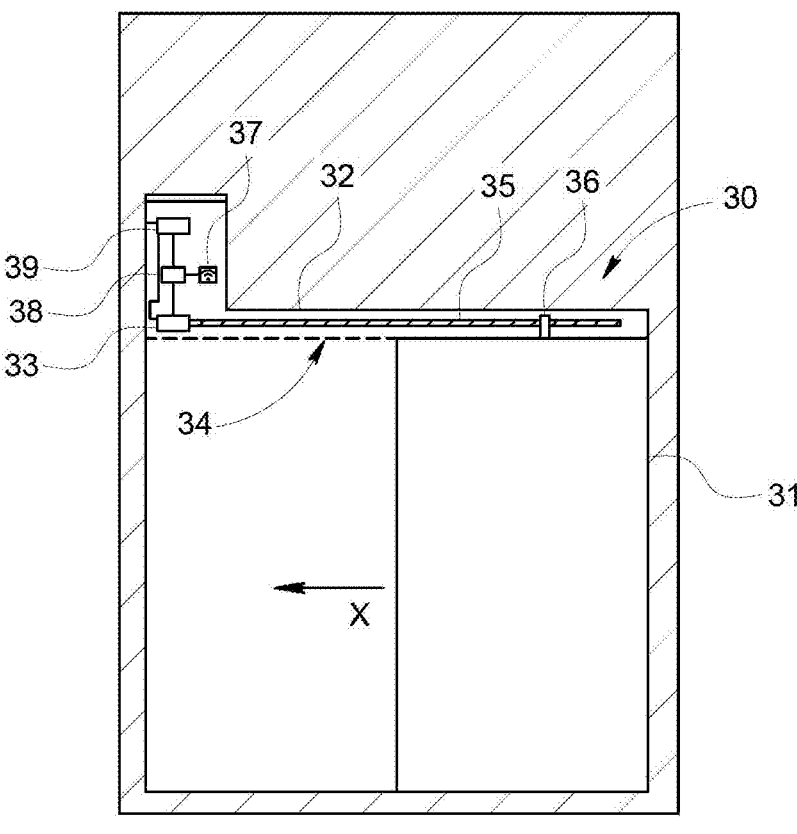
FIG. 3*b* provides a cross-sectional perspective view of one embodiment of the automated door system.

FIGS. 3*a*-3*b* show different aspects of one embodiment of an automated door system 30. FIG. 3*a* provides a perspective front view of the door system 30, which includes a movable door 31 attached to an electronic housing 32. On the other hand, FIG. 3*b* offers a cross-sectional perspective view of the automated door system 30, revealing the electrical and mechanical components contained within the housing 32.

In this embodiment, the movable door 31 is configured to open and close laterally, moving along an X-axis. This lateral movement allows the door 31 to slide open horizontally, creating a convenient and space-efficient entrance for dogs to enter or exit. The movable door 31 is configured to open and close within the frame of the electronic housing 32, which accommodates essential electrical and mechanical elements that drive the automation of the movable door 31.

Two essential components responsible for the automated operation of the movable door 31 are contained within the housing 32, namely, the motor 33 and the mechanism 34. In this embodiment, the mechanism 34 comprises a long rod 35 and a connector 36. The movable door 31 is attached to the rod 35 via the connector 36, and the rod 35 is connected to the motor 33 in a manner that enables rotation when the motor 33 is activated.

Both the rod 35 and the connector 36 have threading. The rod 35 is externally threaded, and the connecter 36 is internally threaded. In this embodiment, the threading is critical to the lateral movement of the door 31. For example, when the motor 33 is activated, causing the rod 35 to rotate, the threading interaction between the rod 35 and the connector 36 initiates a lateral movement of the connector 36. As a result, the movable door 31 is actuated accordingly.

The specific direction of rotation determines the movement of the door 31. For example, one direction of rotation causes the connector 36 to move laterally in one direction, which, in turn, may open the movable door 31, allowing a pet to egress. On the other hand, the reverse direction of rotation may cause the connector to move laterally in the opposite direction, resulting in the closure of the movable door 31.

In this embodiment, the motor 33 is activated by a wireless transceiver 37 connected to a processor 38, which plays a crucial role in coordinating the automated operation of the movable door 31. The wireless transceiver 37 is configured to receive wireless signals through a transmission system, and upon receiving a signal from the wireless transceiver 37, the processor 38 is operable to interpret the signal and respond accordingly.

For example, the received signal may be sent from the dog training device 1 or the user's computerized device 20. When sent from the dog training device 1, the signal may correspond to a request to open the door 31. When sent from the computerized device 20, the signal may correspond to a request to open or close the door 31. Upon the receipt of either signal, the processor 38 is operable to actuate the motor 33 through at least one electrical connection.

To power components within the electronic housing 32, this embodiment utilizes a battery 39. This battery 39 serves as the electrical power source, providing the necessary energy for the operation of the motor 33, the wireless transceiver 37, and the processor 38. To ensure continued functionality, the battery 39 can be recharged from the exterior of the housing 32. This rechargeable feature enables convenient and periodic replenishment of power without the need to have the door system 30 plugged into an external power outlet, which may be impractical depending on the location where the system 30 is mounted.

Figure 4:
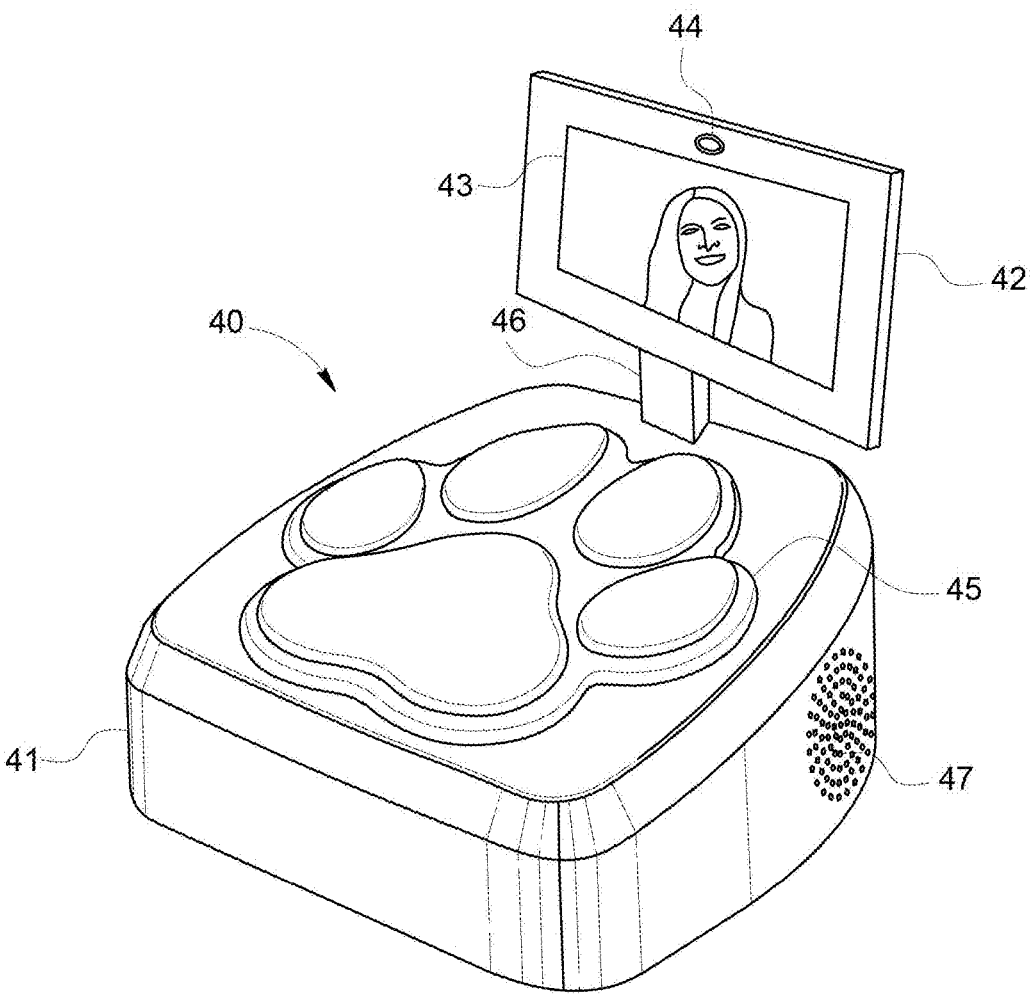
FIG. 4 provides a perspective view of another embodiment of the dog training device.

FIG. 4 provides a perspective view of another embodiment of the dog training device 40. The training device 40 has a main body 41 with distinct top and bottom sections, which may alternatively be referred to as a platform (top) and a base (bottom). At the top of the main body 41, a two-way video monitor 42 is integrated into the training device 40.

The video monitor 42 includes a graphic user interface 43, and a camera 44, enabling real-time visual communication and monitoring between dog and owner. The training device 40 is also equipped with a large button 45 positioned on the platform, which may serve as an activation mechanism for the graphic user interface 43. For example, upon a pressing of the button 45, the training device 41 is operable to send a signal to the user's computerized device, which may simultaneously activate the graphic user interface 43 on the video monitor 42 through an electronic connection.

In this embodiment, the video monitor 42 is affixed to the main body 41 by a stand 46. The stand 46 may house essential electrical components and wiring that are crucial to the operation of the video monitor 42 and the electronic connection with the training device 41. For example, after the sending of the signal from the training device 40, and upon receipt of a response signal from the user's computerized device, the graphic interface 43 on the video monitor 42 becomes operational. Once operational, the interface 43 displays live video from a camera connected to the user's computerized device, thus enabling two-way visual communication between the user and their pet.

The dog training device 40 is also equipped with speakers 47, enabling audio communication. The audio signals generated by the user's computerized device are transmitted as audible sounds through the speakers 47. This allows the user to communicate with their pet using their voice, issuing commands, providing encouragement, or offering affectionate words. The combination of video and audio communication creates an immersive and engaging training experience for both the user and their pet. It fosters effective training sessions, strengthens the bond between the user and their pet, and enhances the overall training process.

Figure 5:
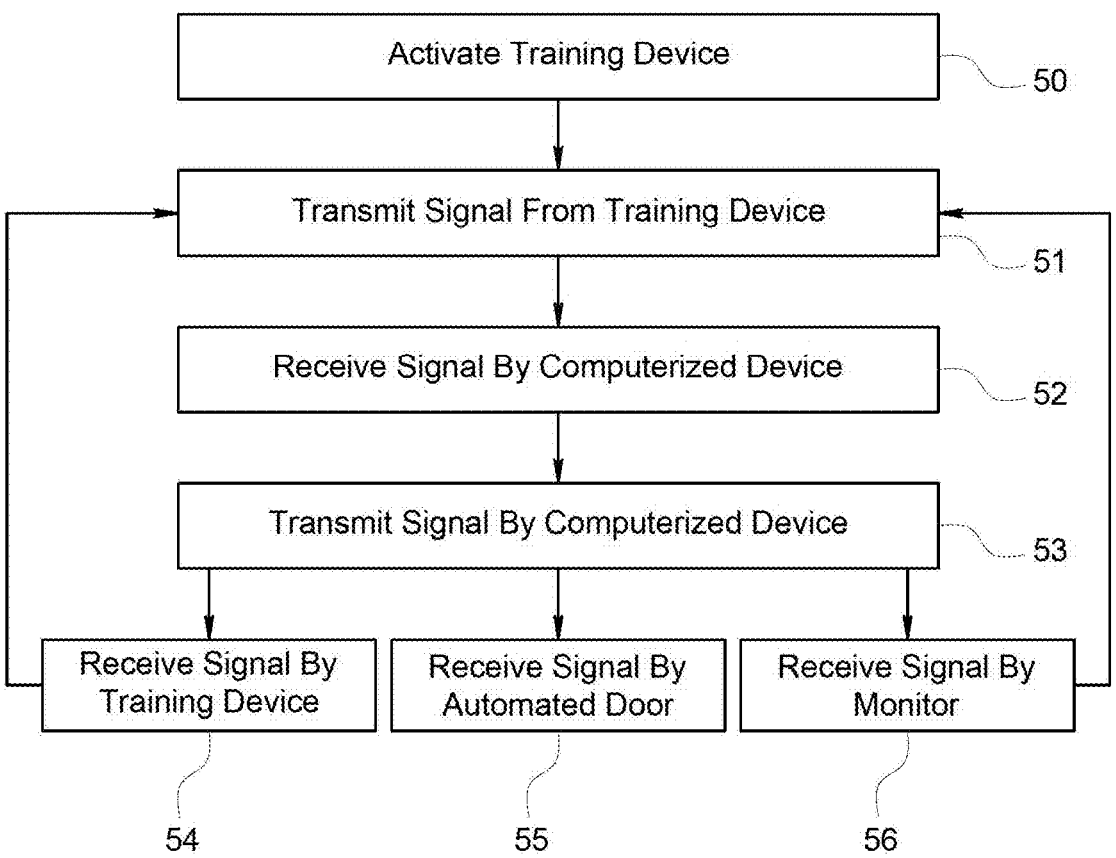
FIG. 5 provides a flow chart of the steps carried out by one embodiment of an electronic communication system.

In FIG. 5, a flow chart represents the steps executed by one embodiment of an electronic communication system, which comprises a dog training device and a computerized device in networked communication. The method carried out by the system begins with the activation of the training device 50.

In this particular embodiment, the activation of the training device 50 is performed by the processor housed within the training device. The processor is designed to respond to an external input from the dog training device. For instance, the activation may be triggered by the dog pressing a designated button on the training device. When the dog interacts with the training device and activates the button through external input, the processor detects this signal.

The activation step is crucial in starting the communication process between the dog training device and the computerized device. It serves as the initial trigger for the system's functionality, enabling subsequent interactions and data exchanges between the two devices. After the initial activation of the training device 50, the subsequent steps in this embodiment of the method are designed to be repeatable any number of times. The repetitive process allows for ongoing communication between the dog training device and the computerized device.

Once the training device is activated, its processor and transmission system, which includes at least one wireless transmitter, are operational. The training device utilizes this capability to transmit a signal 51 to the computerized device. Similarly, the computerized device, equipped with its own processor and at least one wireless transceiver, is capable of receiving the signal 52 sent by the training device. The computerized device processes the received signal and responds accordingly, by for example displaying a notification on its graphic user interface.

Following the reception of the signal 52, the computerized device may proceed to transmit a signal 53 back to the training device. This is accomplished through the computerized device's processor and its own transmission system, which includes at least one wireless transmitter. The signals exchanged between the training device and the computerized device facilitate a seamless two-way communication process. The training device provides data or instructions to the computerized device through its signal 51, while the computerized device responds with appropriate feedback or commands via its signal 53, particularly with regard to audio signals and, in some embodiments, control commands for camera orientation.

The final step in the sequence of method steps depends on the type of signal transmitted by the computerized device. For example, when the transmitted signal from the computerized device is an audio signal or a control command for camera orientation, the training device is designed to receive the signal 54. This means that the training device's audio system or camera control system is capable of receiving and processing the audio signal transmitted by the computerized device. This enables the training device to project the audio signal as audible sound or to move the camera accordingly, thus allowing the user to effectively communicate with and train their pet.

As another example, in embodiments of the training device that incorporate an automated door, the transmitted signal from the computerized device may be a command to open or close the door. In such cases, the wireless transceiver of the automated door is designed to receive the signal 55. The door's wireless communication system interprets the signal to activate the motorized mechanism responsible for opening or closing the door accordingly.

Furthermore, when the transmitted signal from the computerized device is a video signal, the monitor of the training device may be configured to receive the signal 56. The training device's video monitor processes and displays the received video signal, allowing the user to be displayed on the video monitor's graphic user interface. This enables two-way video communication, facilitating real-time visual interaction between the user and their pet.

While several variations of the present disclosure have been illustrated by way of example in preferred or particular embodiments, it is apparent that further embodiments could be developed within the spirit and scope of the present disclosure, or the inventive concept thereof. However, it is to be expressly understood that such modifications and adaptations are within the spirit and scope of the present disclosure, and are inclusive, but not limited to the following appended claims as set forth.

What is claimed is:

1. A training device comprising:
a body having a front, a rear, a top and a bottom;
a base at the bottom of the body;
a platform connected to the base at the top of the body;
a bevel connecting the base to the platform;
wherein a surface of the platform is higher at the rear of the body than at the front of the body, and the surface of the platform slopes down from the rear of the body to the front of the body;
a button positioned on the sloped surface of the platform to be activated by an animal and a transmission system housed within the training device;
wherein the base and the platform are rounded and do not have sharp corners; and
wherein a top edge of the platform is offset from a top edge of the base.

2. The training device of claim 1 wherein the transmission system comprises a wireless transmitter.

3. The training device of claim 1 further comprising:
a processor housed within the training device, wherein the processor is operable to send a signal via the transmission system upon activation of the button;
a speaker, wherein the signal is an audio signal sent to the speaker; and
wherein the speaker is operable to receive the audio signal and project an audible sound.

4. The training device of claim 3 wherein the speaker is positioned on at least one of a left side or a right side of the base near the rear of the body.

5. The training device of claim 1 further comprising a built-in camera within the bevel.

6. The training device of claim 5 wherein the built-in camera is positioned below the button at the front of the body.

7. The training device of claim 1 wherein the training device is water resistant.

8. An electronic communication system for training an animal comprising:
a training device comprising:
a body having a front, a rear, a top and a bottom;
a base at the bottom of the body;
a platform connected to the base at the top of the body;
wherein a surface of the platform is higher at the rear of the body than at the front of the body, and the surface of the platform slopes down from the rear of the body to the front of the body;
a button positioned on the sloped surface of the platform to be activated by an animal and a transmission system housed within the training device;
wherein the base and the platform are rounded and do not have sharp corners;
wherein the training device is operable to transmit a signal to at least one of a computerized device or an electronic housing;
wherein the computerized device is operable to receive the signal and present a notification upon receiving the signal;
wherein the notification is displayed on a user interface of the computerized device;

wherein the notification is at least one of a push notification or a text message comprising language regarding a need;

wherein the electronic housing is operable to receive a first signal from at least one of the computerized device or the training device.

9. The electronic communication system of claim 8 wherein the computerized device is selected from a group consisting of a smartphone, a tablet, a laptop, a desktop computer, a smart television, and a smartwatch.

10. The electronic communication system of claim 8 wherein the electronic housing does not comprise a user interface.

11. The electronic communication system of claim 8 wherein the training device, the computerized device, and the electronic housing are wirelessly connected.

12. The electronic communication system of claim 8 wherein the electronic housing further comprises a processor and a wireless transceiver.

13. The electronic communication system of claim 12 wherein the wireless transceiver is operable to receive the first signal.

14. The electronic communication system of claim 12 wherein the processor is operable to activate an electrical component housed within the electronic housing.

15. The electronic communication system of claim 14 wherein the electrical component is activated via a wired electrical connection.

16. The electronic communication system of claim 8 wherein the training device further comprises a bevel connecting the base to the platform.

17. The electronic communication system of claim 8 wherein a top edge of the platform is offset from a top edge of the base.

18. The electronic communication system of claim 8 further comprising a speaker.

19. The electronic communication system of claim 18 wherein the speaker is operable to receive an audio signal from at least one of the training device, the computerized device, or the electronic housing.

20. The electronic communication system of claim 8 wherein the need is at least one of urination or defecation by the animal.

* * * * *